United States Patent [19]

Okazaki et al.

[11] Patent Number: 4,909,595

[45] Date of Patent: Mar. 20, 1990

[54] OPTICAL WAVELENGTH CONVERSION METHOD AND OPTICAL WAVELENGTH CONVERTER MODULE

[75] Inventors: Yoji Okazaki; Koji Kamiyama; Akinori Harada; Takayuki Katoh, all of Kanagawa, Japan

[73] Assignee: Fuji Photo Film Co., Ltd., Kanagawa, Japan

[21] Appl. No.: 244,211

[22] Filed: Sep. 14, 1988

[30] Foreign Application Priority Data

Sep. 14, 1987 [JP] Japan .................. 62-230659
Sep. 14, 1987 [JP] Japan .................. 63-230660
Sep. 9, 1988 [JP] Japan .................. 63-225750

[51] Int. Cl.[4] .......................... G02B 6/02; G02B 6/16
[52] U.S. Cl. ........................ 350/96.29; 350/96.34; 307/427
[58] Field of Search ................... 350/96.1, 96.34; 307/427, 430

[56] References Cited

U.S. PATENT DOCUMENTS 4,536,450 8/1985 Garito .................. 428/411.1

Primary Examiner—Frank Gonzalez
Attorney, Agent, or Firm—Sughrue, Mion, Zinn, Macpeak & Seas

[57] ABSTRACT

A bulk crystal type optical wavelength converter device is made of a monocrystalline nonlinear optical material (3,5-dimethyl-1-(4-nitrophenyl)pyrazole, referred to as PRA). A linearly polarized fundamental having a wavelength ranging from 900 to 4000 nm is applied to the bulk monocrystalline nonlinear optical material to achieve angular phase matching of the type I for obtaining a second harmonic of the fundamental. An optical wavelength converter module comprises a fiber type optical wavelength converter device and a light source device. The optical wavelength converter device includes a core made of a monocrystal of the PRA which has a crystal orientation such that the c-axis thereof extends substantially along the axis of the core. The light source device applies, to the optical wavelength converter device, a fundamental which is linearly polarized in the direction of the a-axis or b-axis of the crystal which is normal to the c-axis.

3 Claims, 9 Drawing Sheets

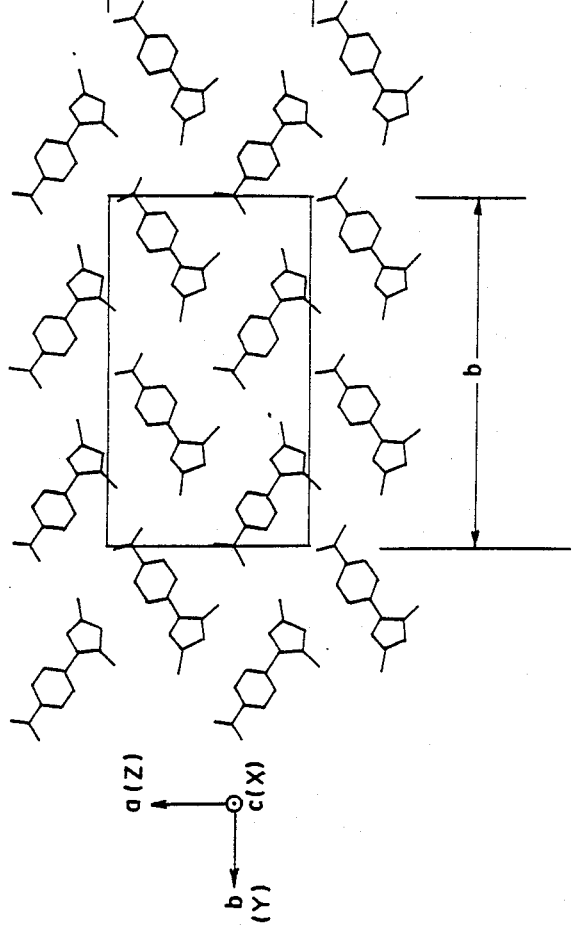
FIG. 2A
FIG. 2C
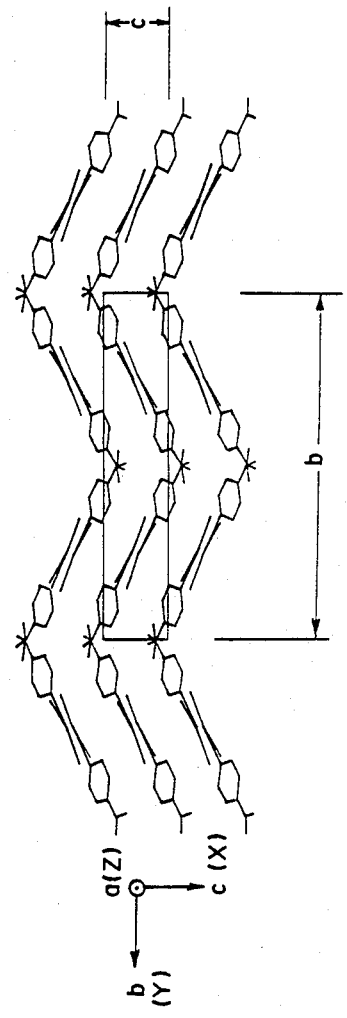
FIG. 2B

FUNDAMENTAL INCIDENT DIRECTION (WAVE NORMALS)

OPTICAL WAVELENGTH CONVERSION METHOD AND OPTICAL WAVELENGTH CONVERTER MODULE

BACKGROUND OF THE INVENTION

1. Field of the Invention

The present invention relates to an optical wavelength conversion and an optical wavelength converter module for converting a fundamental generated by a light source to a second harmonic having a wavelength which is ½ of the wavelength of the fundamental, with an optical wavelength converter device.

2. Description of the Prior Art

Various attempts have heretofore been made for converting the wavelength of a laser beam into a shorter wavelength based on the generation of a second harmonic by a nonlinear optical material. One example of an optical wavelength converter device for effecting such laser wavelength conversion is a bulk crystal type converter device as disclosed, for example, in "Introduction to Optical Electronics" written by A Yariv and translated by Kunio Tada and Takeshi Kamiya (published by Maruzen K.K.), pages 200-204. A phase matching process for KTP which is a biaxial crystal is described in detail by Yao, et al in J. Appl. Phys. Vol. 55, page 65 (1984).

Conventional optical materials of nonlinear optical constants for use as the above bulk crystal type converter device include inorganic materials such as LiNbO₃ and KTP and organic materials such as MNA(2-methyl-4-nitroaniline) disclosed in Japanese Laid-Open Patent Publication No. 60-250334, NPP(N-(4-nitrophenyl)-L-prolinol), NPAN(N-(4-nitrophenyl)-N-methylaminoacetonitrile), and the like disclosed in J. Opt. Soc. Am. B. Vol. 4, page 977 (1987). These organic nonlinear optical materials such as MNA, NPP, and the like have larger nonlinear optical constants than the inorganic nonlinear optical materials such as LiNbO₃ and KTP, and hence are advantageous in that their wavelength conversion efficiency is high, they have a high dielectric breakdown threshold value, and are subject to less optical damage.

The optical wavelength converter device of the bulk crystal type relies upon the birefringence of a crystal in order to meet phase matching conditions. Therefore, any material which does not exhibit birefringence or exhibits only small birefringence cannot be employed even if it has high nonlinearity.

A fiber type optical wavelength converter device has been proposed to solve the above problem. The optical wavelength converter device of this type is in the form of an optical fiber comprising a core made of a nonlinear optical material surrounded by cladding. One example of such an optical fiber is shown in the bulletin Vol. 3, No. 2, of the Microoptics Research Group of a Gathering of the Applied Physics Society, pages 28-32. Recently, many efforts are directed to the study of a fiber type optical wavelength converter device since it can easily effect gain matching between a fundamental and a second harmonic.

For increasing the wavelength conversion efficiency of the fiber type optical wavelength converter device, it is preferable to employ an optical material of high nonlinear optical constants as a core. Known optical materials of high nonlinear optical constants include those referred to above.

Where a fiber type optical wavelength converter device is constructed of a nonlinear optical material of the type described above, however, the wavelength conversion efficiency of the optical wavelength converter device is not so increased since the crystal is not oriented in such a direction as to be able to utilize the maximum nonlinear optical constants of the material. The wavelength conversion efficiency of the optical wavelength converter device is longer as the length of the device is larger. The nonlinear optical materials referred to above are however not suitable for making long optical wavelength converter devices because it is difficult to obtain a uniform monocrystal from those nonlinear optical materials.

The absorption edges of the above nonlinear optical materials, e.g., MNA and NPP, are in the vicinity of 450 nm and 480 nm, respectively. Therefore, it is difficult to generate a second harmonic in a blue range, with its wavelength being near 400 nm, by employing, as a fundamental light source, a semiconductor laser that is widely used at present which has an excitation wavelength close to 800 nm. This is also the case with the optical wavelength converter device of the bulk crystal type described above. Moreover, KTP, LiNbO₃, and the like which are inorganic materials have an absorption edge of 400 nm or below. While these materials can produce a second harmonic in a blue range, they are disadvantageous in that the performance index of wavelength conversion is lower than that of organic materials by one figure or more. Likewise, since their performance index is low when obtaining second harmonics in longer wavelength ranges such as of green, red, and the like, the efficiency of wavelength conversion is low.

SUMMARY OF THE INVENTION

In view of the aforesaid drawbacks of the conventional optical wavelength converter devices, it is an object of the present invention to provide an optical wavelength conversion method and an optical wavelength module which have a high wavelength conversion efficiency and is capable of easily obtaining a second harmonic in a blue range.

According to an optical wavelength conversion method of the present invention, a bulk crystal type optical wavelength converter device which is made of a monocrystalline nonlinear optical material (3,5-dimethyl-1-(4-nitrophenyl)pyrazole: hereinafter referred to as "PRA") represented by the following molecular diagram:

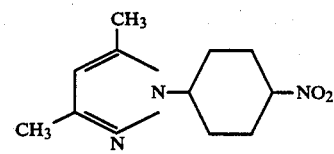

is employed, and a linearly polarized fundamental having a wavelength ranging from 900 to 4000 nm is applied to this bulk monocrystal to obtain a second harmonic thereof by attaining angular phase matching of the type I.

The PRA is disclosed in Japanese Laid-Open Patent Publn. No. 62-210432. The description of this prior application also states that the PRA has a nonlinear optical effect. However, in actually constructing a bulk crystal type optical wavelength converter device of the PRA, it has not been known how to achieve good phase matching between the fundamental and a second harmonic to be produced.

In the method of the present invention, angular phase matching of the type I can be achieved. The principles of the method for accomplishing such angular phase matching will be described below. Crystal structures of the PRA are shown in FIGS. 2A, 2B, and 2C. FIG. 3 shows the bulk crystal structure of the PRA. The PRA crystal is of an orthorhombic system, and its point group is mm2. Therefore, the tensor of the nonlinear optical constants is as follows:

$$d = \begin{pmatrix} 0 & 0 & 0 & 0 & d_{15} & 0 \\ 0 & 0 & 0 & d_{24} & 0 & 0 \\ d_{31} & d_{32} & d_{33} & 0 & 0 & 0 \end{pmatrix}$$

Assuming that optical axes X, Y, Z are determined with respect to crystal axes a, b, c as shown in FIG. 3, $d_{31}$ is a nonlinear optical constant for extracting a second harmonic which is Z-polarized by applying light which is linearly polarized in the direction X (X-polarized light) as a fundamental. Similarly, $d_{32}$ is a nonlinear optical constant for extracting a second harmonic which is Z-polarized by applying light which is linearly polarized in the direction Y (Y-polarized light) as a fundamental. Likewise, $d_{33}$ is a nonlinear optical constant for extracting a second harmonic which is Z-polarized by applying light which is linearly polarized in the direction Z (Z-polarized light) as a fundamental. $d_{24}$ is a nonlinear optical constant for extracting a Y-polarized second harmonic by applying Y- and Z-polarized fundamentals. $d_{15}$ is a nonlinear optical constant for extracting an X-polarized second harmonic by applying X- and Z-polarized fundamentals. The magnitudes of the respective nonlinear optical constants are given in the following table:

|     | (1) | (2) |
| --- | --- | --- |
| $b_{31}$ | 26 | — |
| $b_{32}$ | 160 | 240 ± 140 |
| $b_{33}$ | 67 | 70 ± 10 |
| $b_{15}$ | 26 | — |
| $b_{24}$ | 160 | — |

The values in the column (1) are obtained by an X-ray crystal structure analysis and the values in the column (2) are measured by the Marker Fringe process, with their unit being [$\times 10^{-9}$ esu] in both columns.

Comparison with $d_{31}$ of LiNbO$_3$ for performance indexes based on the above values indicates that $d_{32}$ of the PRA is 260 times greater.

Since the PRA is of an orthorhombic system and a biaxial crystal, it has a refractive index $n_x$ when the plane of polarization of light is in the direction of the optical X-axis (the c-axis of the crystal), a refractive index $n_y$ when the plane of polarization of light is in the direction of the Y-axis (the b-axis of the crystal) normal to the X-axis, and a refractive index $n_z$ when the plane of polarization of light is in the direction of the Z-axis (the a-axis of the crystal) normal to the X- and Y-axes. The wavelength dispersion at these refractive indexes $n_x$, $n_y$, $n_z$ is shown in FIG. 4.

The lower limit wavelength for angular phase matching at normal temperature is 950 nm. This lower limit wavelength can be varied by about 50 nm by varying the temperature of the bulk crystal. According to the present invention, therefore, the lower limit wavelength of the fundamental applied to the optical wavelength converter device is selected to be 900 nm. If the wavelength of the fundamental is in excess of 4000 nm, it is considered that the wavelength will interfere with the vibration level of the PRA molecules, and hence the fundamental will be absorbed by the PRA molecules. According to the present invention, therefore, the upper limit wavelength of the fundamental is selected to be 4000 nm.

A phase matching process for a biaxial crystal is described in detail in the aforesaid article by Yao, et al. More specifically, it is assumed that, as shown in FIG. 13, the angle between the wave normals and the optical axis Z of the crystal is $\phi$ and the angle from the X axis in the X-Y plane is $\theta$. It is also assumed that the refractive indexes for the fundamental and a second harmonic applied at desired angles are represented by $n^\omega$, $n^{2\omega}$, respectively, and the refractive indexes for the fundamental and the second harmonic at the respective axes are indicated by $n_x^\omega$, $n_y^\omega$, $n_z^\omega$, $n_x^{2\omega}$, $n_y^{2\omega}$, $n_z^{2\omega}$, respectively. When $$kx = \sin \phi \cdot \cos \theta$$
$$ky = \sin \phi \cdot \cos \theta$$
$$kz = \cos \phi,$$

$$\frac{kx^2}{(n^\omega)^{-2} - (n_x^\omega)^{-2}} + \frac{ky^2}{(n^\omega)^{-2} - (n_y^\omega)^{-2}} + \quad (1\text{-}1)$$

$$\frac{kz^2}{(n^\omega)^{-2} - (n_z^\omega)^{-2}} = 0$$

$$\frac{kx^2}{(n^{2\omega})^{-2} - (n_x^{2\omega})^{-2}} + \frac{ky^2}{(n^{2\omega})^{-2} - (n_y^{2\omega})^{-2}} + \quad (1\text{-}2)$$

$$\frac{kz^2}{(n^{2\omega})^{-2} - (n_z^{2\omega})^{-2}} = 0$$

The solutions to the above equations (1-1), (1-2) are phase matching conditions. When $$B_1 = -kx^2 (b_1 + c_1)$$
$$\phantom{B_1 =} -ky^2 (a_1 + c_1)$$
$$\phantom{B_1 =} -kz^2 (a_1 + b_1)$$

$$C_1 = kx^2 b_1 c_1 + ky^2 a_1 c_1 + kz^2 a_1 b_1$$

$$B_2 = -kx^2 (b_2 + c_2)$$
$$\phantom{B_2 =} -ky^2 (a_2 + c_2)$$
$$\phantom{B_2 =} -kz^2 (a_2 + b_2)$$

$$C_2 = kx^2 b_2 c_2 + ky^2 a_2 c_2 + kz^2 a_2 b_2$$

$$a_1 = (n_x^\omega)^{-2} \quad a_2 = (n_x^{2\omega})^{-2}$$
$$b_1 = (n_y^\omega)^{-2} \quad b_2 = (n_y^{2\omega})^{-2}$$
$$c_1 = (n_z^\omega)^{-2} \quad c_2 = (n_z^{2\omega})^{-2},$$

then the solutions to the equations (1-1), (1-2) are given as follows:

$$n^{\omega},i = \frac{\sqrt{2}}{\sqrt{-B_1 \pm \sqrt{B_1^2 - 4C_1}}}$$

$$n^{2\omega},i = \frac{\sqrt{2}}{\sqrt{-B_2 \pm \sqrt{B_2^2 - 4C_2}}}$$

(when i=1, the double sign is +, and when i=2, the double sign is −)

The phase matching condition for the type I is $$n^{\omega},2 = n^{2\omega},1 \tag{1-3}$$

The phase matching condition for the type II is $$\tfrac{1}{2}(n^{\omega},1 + n^{\omega},2) = n^{2\omega},1$$

In the present invention, phase matching for the type I is achieved when the angles $\phi$, $\theta$ meeting the equation (3) exist.

For the sake of brevity, the case wherein $\phi = 90°$ will be described below. With the PRA shown in FIG. 4, the relationship: $n_x < n_z < n_y$ exists at all times in the wavelength range of from 900 to 4000 nm. Accordingly, angular phase matching can be achieved by applying the fundamental with its plane of polarization being inclined in an intermediate direction between the directions of the X- and Y-axes, and also by bringing an intermediate refractive index $n_{xy}$ between refractive indexes $n_x$, $n_y$ with respect to the fundamental in accord with a refractive index $n_z$ with respect to the second harmonic. That is, $$n_z^{2\omega} = n_{xy}^{\omega} \tag{1}$$

Assuming that he angle from the X axis in the X-Y plane is $\theta$, the following equation is obtained:

$$\frac{1}{(n_{xy}^{\omega})^2} = \frac{1}{(n_x^{\omega})^2} \sin^2\theta + \frac{1}{(n_y^{\omega})^2} \cos^2\theta \tag{2}$$

where the fundamental wavelength is 950 nm, the refractive indexes $n_x$, $n_y$ are obtained as 1.521, 1.775, respectively, from FIG. 4. The refractive index $n_z$ for the wavelength 475 nm which is half of the fundamental wavelength is obtained as 1.775. The angle $\theta$ which meets the above formulas (1) and (2) with these values of the refractive indexes is about 0°. The relationship between the refractive indexes $n_x^{2\omega}$, $n_y^{\omega}$, $n_{xy}^{\omega}$, and $n^2{}_z^{\omega}$ in this case is shown in FIG. 5.

Where the fundamental wavelength is 1200 nm, the refractive indexes $n_x$, $n_y$ are obtained as 1.519, 1.767, respectively, from FIG. 4. The refractive index $n_z$ for the wavelength 600 nm is obtained as 1.775. The angle $\theta$ which meets the above formulas (1) and (2) with these values of the refractive indexes is about 22°. Similarly, since the refractive indexes for fundamentals of wavelengths of 1200 nm and 4000 nm remain substantially the same, the angle $\theta$ that meets the equations (1), (2) necessarily exists. The relationship between $n_x^{\omega}$, $n_y^{\omega}$, $n_{xy}^{\omega}$, and $n_z^{2\omega}$ in this case is shown in FIG. 6. The value of the angle $\theta$ can be valued by about 3° dependent on the temperature of the PRA crystal.

Therefore, on the assumption that the lower limit wavelength for angular phase matching varies by 50 nm dependent on the temperature of the PRA crystal, the angle $\theta$ which can achieve phase matching of the type I necessarily exists in a fundamental wavelength range of from 900 to 4000 nm. Likewise, a combination of angles $\theta$, $\phi$ which can attain phase matching of the type I exists in the fundamental wavelength of from 900 to 4000 nm, with respect to a particular angle of $\phi$ not only in the $\phi=90°$, making it possible to produce a second harmonic of fundamentals of such a wavelength range.

The spectrum of light transmitted through a thin film of PRA having a thickness of 200 $\mu$ is illustrated in FIG. 8. As show in FIG. 8, the PRA does not absorb much light in the vicinity of the wavelength of 400 nm. Therefore, the optical wavelength converter device made of the bulk crystal of PRA can generate a second harmonic highly efficiency in a blue range.

According to the present invention, furthermore, an optical wavelength converter module comprises a fiber type optical wavelength converter device and a light source device. The optical wavelength converter device includes a core made of a monocrystal of the PRA described above. The PRA of the core has a crystal orientation such that the c-axis thereof extends substantially along the axis of the core. The light source device applies, to the optical wavelength converter device, a fundamental which is linearly polarized in the direction of the a-axis or b-axis of the crystal which is normal to the c-axis.

The PRA is disclosed in Japanese Laid-Open Patent Publn. No. 62-210432, as described above. In actually constructing a fiber type optical wavelength converter device of the PRA, it has not been known how to select crystal orientation and the direction of polarization of a fundamental to be applied to the optical wavelength converter device for higher wavelength conversion efficiency.

The principles according to the present invention for obtaining higher wavelength conversion efficiency by selecting crystal orientation of a nonlinear optical material and the direction in which a fundamental is to be linearly polarized will be described below.

As can been seen from the above table of nonlinear optical constants, the optical constants $d_{32}$, $d_{33}$, $d_{24}$ are of large values. Particularly, the values of $d_{32}$, $d_{24}$ are large next to one nonlinear optical constant of $600 \times 10^{-9}$ esu of the MNA and one nonlinear optical constant of $200 \times 10^{-9}$ esu (It is difficult to orient the crystals of MNA and NPP in fiber type optical wavelength converter devices so that the large nonlinear optical constants of NA and NPP can actually be utilized, as described above). As shown in FIG. 4, in filling a core 111 of the PRA in cladding 112 to form a fiber type optical wavelength converter device 110 the crystal of the PRA is oriented such that its c-axis (which is the optical X-axis) extends in the direction of the core axis (this can be achieved by a method that will be described later on). The above large nonlinear optical constants $d_{32}$, $d_{33}$ can then be utilized by applying, to the optical wavelength converter device 110, a fundamental which is linearly polarized in the direction of the a-axis (which is the optical Z-axis) of the crystal or the b-axis (which is the optical Y-axis) of the crystal.

For utilizing the nonlinear optical constant $d_{24}$, it is necessary to apply both Y- and Z-polarized fundamentals to the fiber type optical wavelength converter device. Therefore, due to refractive index anisotropy of the PRA, it is difficult to achieve a single mode for higher efficiency. Where the Y- or Z-polarized fundamental is applied to the fiber type optical wavelength converter device, on the other hand, a single mode can sufficiently be accomplished for higher efficiency.

FIG. 5 shows a transmission spectrum of the PRA in a solvent (concentration: $4 \times 10^{-4}$ mol/l, solvent: ethanol). As illustrated in FIG. 5, the PRA does not absorb much light in the vicinity of the wavelength of 400 nm. Therefore, the optical wavelength converter device employing the PRA as the core is capable of generating a second harmonic highly efficiently in a blue range.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 2A, 2B, and 2C are diagrams showing crystal structures of PRA along b-, c-, and a-axes, respectively;

DESCRIPTION OF THE PREFERRED EMBODIMENTS

<1st Embodiment>

Figure 1:
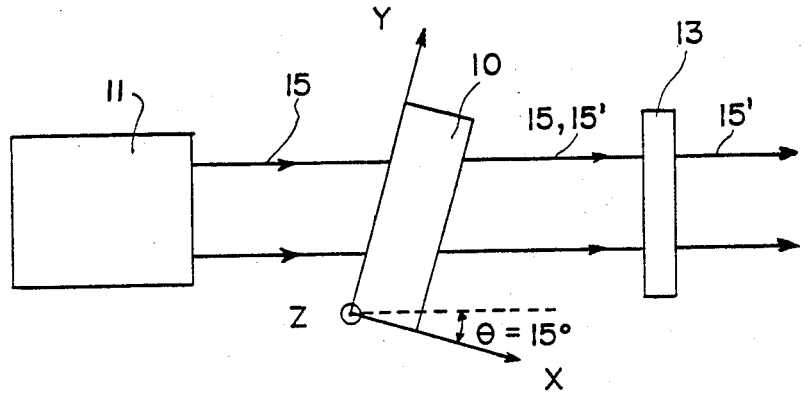
FIG. 1 is a schematic view of a device for carrying out a method of the present invention.
Figure 3:
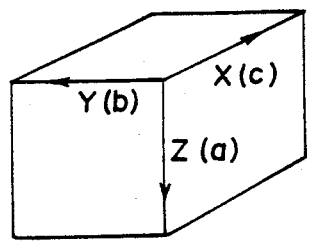
FIG. 3 is a view showing the bulk crystal structure of the PRA.
Figure 4:
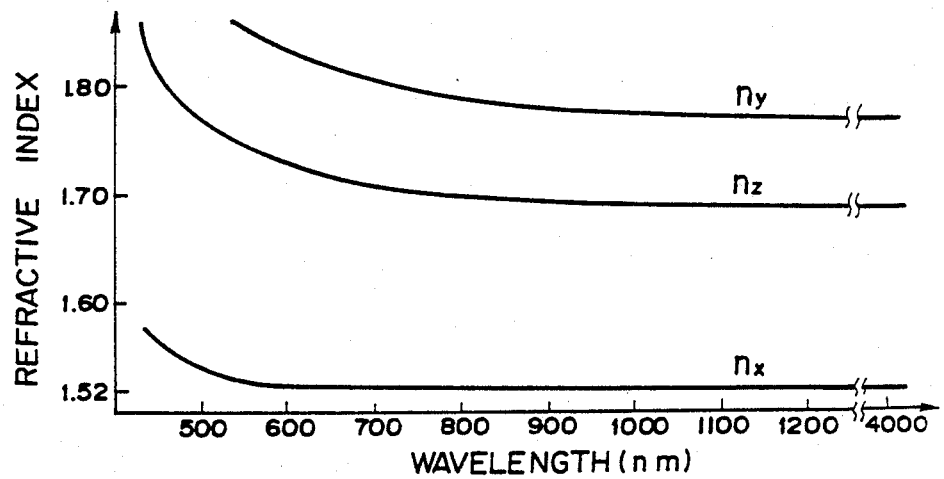
FIG. 4 is a graph showing wavelength dispersion at refractive indexes of the PRA.
Figure 5:
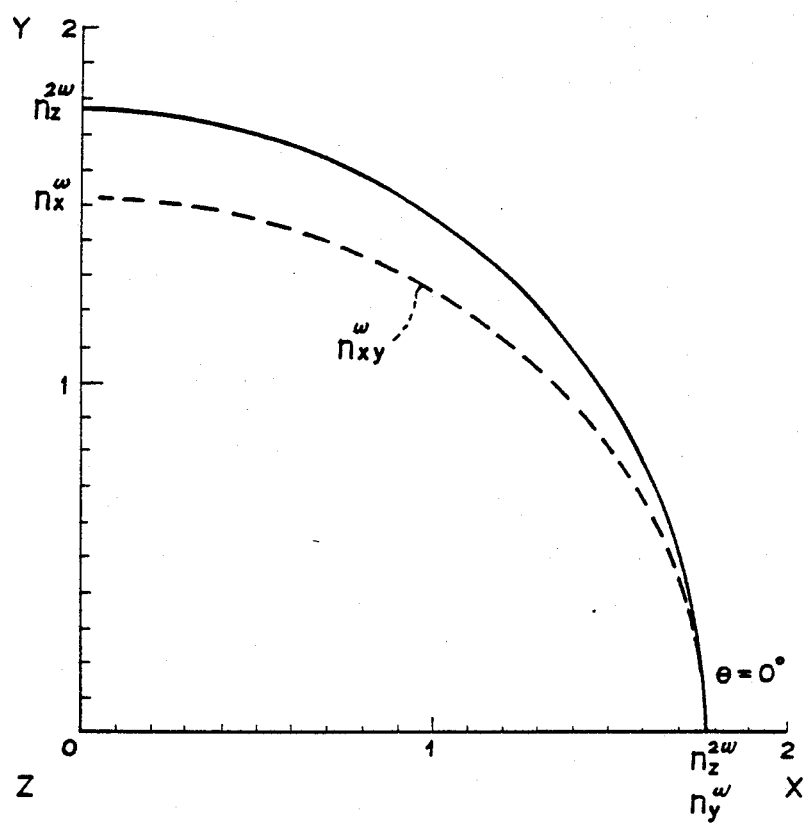
FIGS. 5, 6, and 7 are graphs explaining angular phase matching between a fundamental and a second harmonic in the method of the present invention.
Figure 6:
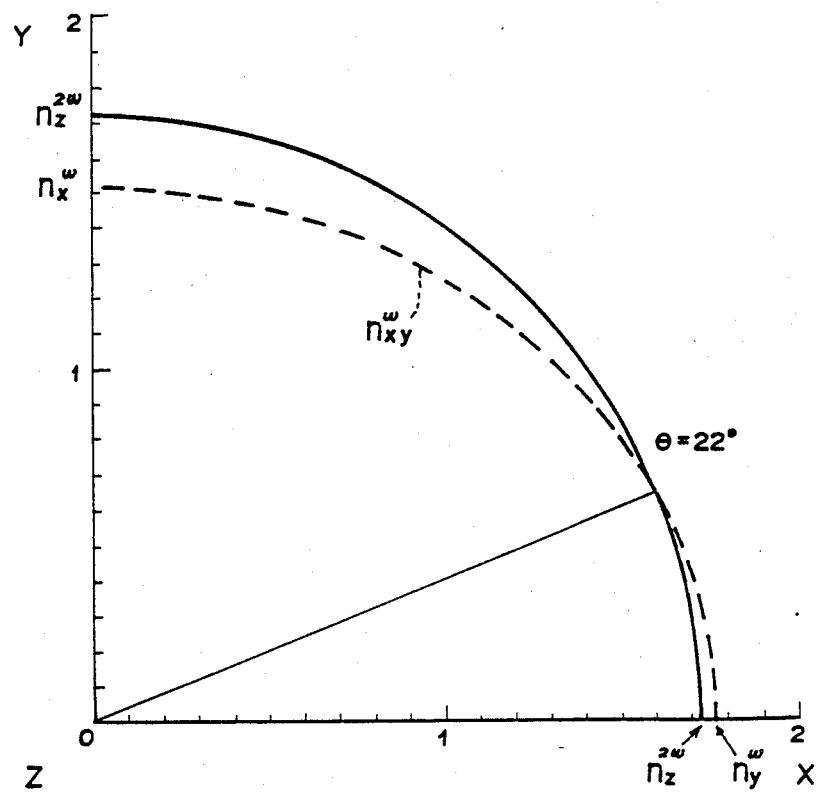

FIG. 1 shows a device for converting a fundamental to a second harmonic which has a wavelength that is $\frac{1}{2}$ of the wavelength of the fundamental according to a method of the present invention. First, a process of manufacturing an optical wavelength converter device 10 will be described below. The device 10 can be fabricated by the usual Bridgman method. First, the PRA in a melted state is poured into a suitable mold and ten rapidly cooled, so that the PRA ss polycrystallized. Thereafter, the PRA is gradually pulled out of a furnace which is kept at a higher temperature (e.g., 105° C.) than its melting point of 102° C., into an outer space which is kept at a temperature lower than that melting point, for thereby causing the PRA in the melted state to be monocrystallized continuously at the point where it is withdrawn from the furnace. The PRA as it is withdrawn from the furnace is monocrystallized for a range of 50 mm or more, thus forming the PRA with a uniform crystal orientation. Therefore, the optical wavelength converter device 10 thus formed is sufficiently long. Since the wavelength conversion efficiency of the optical wavelength converter device of this type is proportional to the square of the length of the device, as is well known in the art, the longer the optical wavelength converter device, the greater the practical value of the device.

The PRA monocrystal thus fabricated is cut off in an Y-Z plane containing the optical Y- and Z-axes (the b- and a-axes of the crystal) into a thickness of 2 mm in the direction of the X-axis (the c-axis of the crystal), thus forcing the optical wavelength converter device 10 of the bulk monocrystal type.

Figure 7:
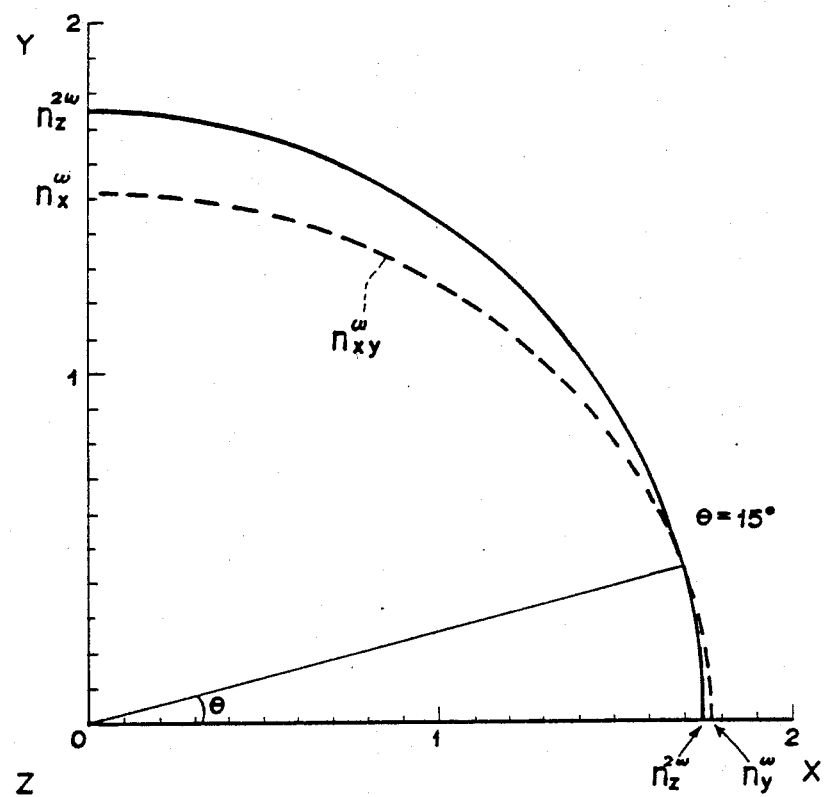
Figure 8:
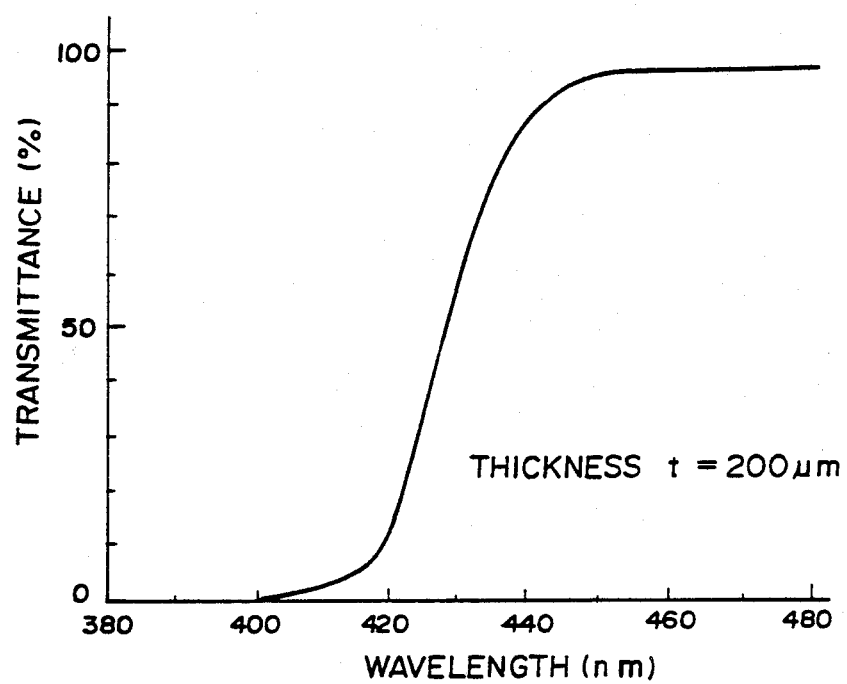
FIG. 8 is a graph illustrating a transmission spectrum of a thin film of the PRA.

As shown in FIG. 1, a fundamental 15 is applied to the optical wavelength converter device 10. In the embodiment shown in FIG. 1, a YAG laser 11 is used as a light source for emitting a fundamental. A laser beam (fundamental) 15 having a wavelength of 1064 nm emitted from the YAG laser 11 is applied to the optical wavelength converter device 10. At this time, the fundamental 15 is applied with the wave normals being inclined 15° from the X-axis toward the Y-axis. The angle 15° is determined according to the formulas (1) and (2) and based on the wavelength dispersion at the refractive indexes $n_x$, $n_y$, and $n_z$. The relationship between $n_x^\omega$, $n_y^\omega$, and $n_z^{2\omega}$ in this case is illustrated in FIG. 7.

The fundamental 15 applied to the optical wavelength converter device 10 of the PRA is converted to a second harmonic 15' having a wavelength which is $\frac{1}{2}$ (=532 nm) of the wavelength of the fundamental 15. Therefore, a beam which is a mixture of the second harmonic 15' and the fundamental 15 is emitted from the optical wavelength converter device 10. The emitted beam 15 is passed through a bandpass filter 1 which allows the second harmonic 15' of 532 nm to pass therethrough while absorbing the fundamental 15 of 1064 nm. Therefore, only the second harmonic 15' is extracted for use. It was confirmed that the second harmonic 15' was Z-polarized light. In this embodiment, therefore, the above formula (1) is met to achieve phase matching between the fundamental 15 and the second harmonic 15'. The nonlinear optical constant $d_{32}$ of high value is utilized.

Figure 14:
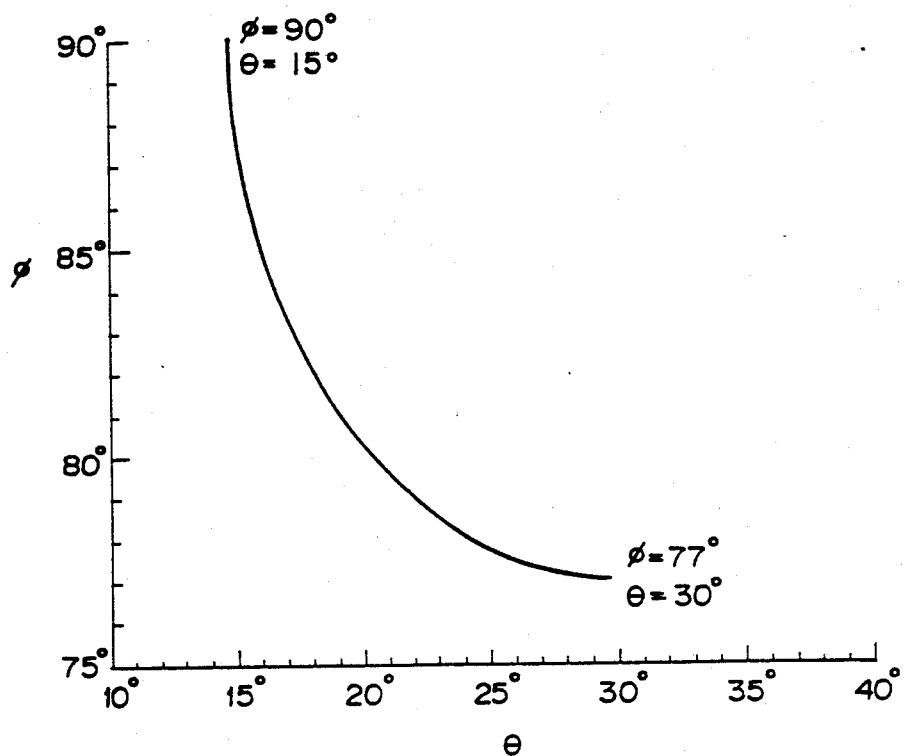
FIG. 14 is a graph showing combinations of the angles $\phi$, $\theta$.

While the case in which $\phi=90°$ has been described, not only $\phi=90°$, but also angles $\theta$, $\phi$ which can achieve phase matching exist as shown in FIG. 14.

As a comparative example, a bulk monocrystal of $LiNbO_3$ having a thickness of 2 mm was fabricated, and a YAG laser beam was applied as a fundamental by the same device as shown in FIG. 1 to emit a second harmonic. The second harmonics 15' (passed through the bandpass filter 13) produced in this comparative example and the above embodiment) were measured for light intensity. It was found that the light intensity of the second harmonic produced in the embodiment was higher than that of the comparative example by one figure or more.

<2nd Embodiment>

A PRA bulk monocrystal was fabricated in the same manner as the first embodiment. A laser beam having a wavelength of 1300 nm emitted from an optical communication semiconductor laser having output power of about 100 mW was applied as a fundamental to the bulk monocrystal, with desired angles $\theta$, $\phi$ which achieve phase matching being selected. As a result, a second harmonic having output power of about 0.1 $\mu$W and a wavelength of 650 nm was obtained. Inasmuch as a second harmonic could be generated from a fundamental of very low power, it was proven that the wavelength conversion efficiency of the crystal is sufficiently high.

With the optical wavelength conversion method of the present invention, since angular phase matching can be achieved between the fundamental and the second harmonic by appropriately selecting the direction of polarization of the fundamental to be applied to the PRA crystal, the high nonlinear optical constants which the PRA has can actually be utilized in the bulk crystal type nonlinear optical material for very high wavelength conversion efficiency. Inasmuch as the PRA has an absorption edge in the vicinity of 400 nm, a second harmonic in a blue range can efficiently be extracted by the method of the invention which employs the PRA bulk monocrystal.

<3rd Embodiment>

Figure 9:
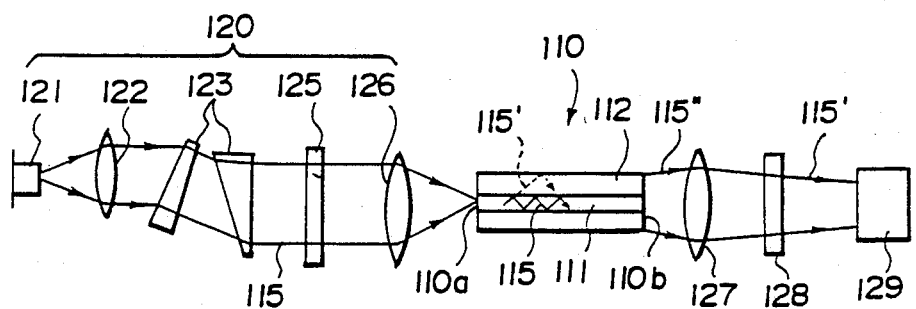
FIG. 9 is a schematic view of an optical wave-length converter module according to a embodiment of the present invention.

FIG. 9 shows an optical wavelength converter module according to a third embodiment of the present invention. The optical wavelength converter module comprises a fiber type optical wavelength converter device 110 and a light source device 120 for applying a fundamental to the optical wavelength converter device 110.

Figure 12:
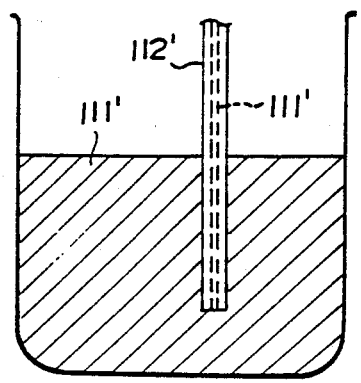
FIG. 12 is a view showing a process of making the optical wavelength converter device which constitutes the optical wavelength converter module of the present invention.
Figure 11:
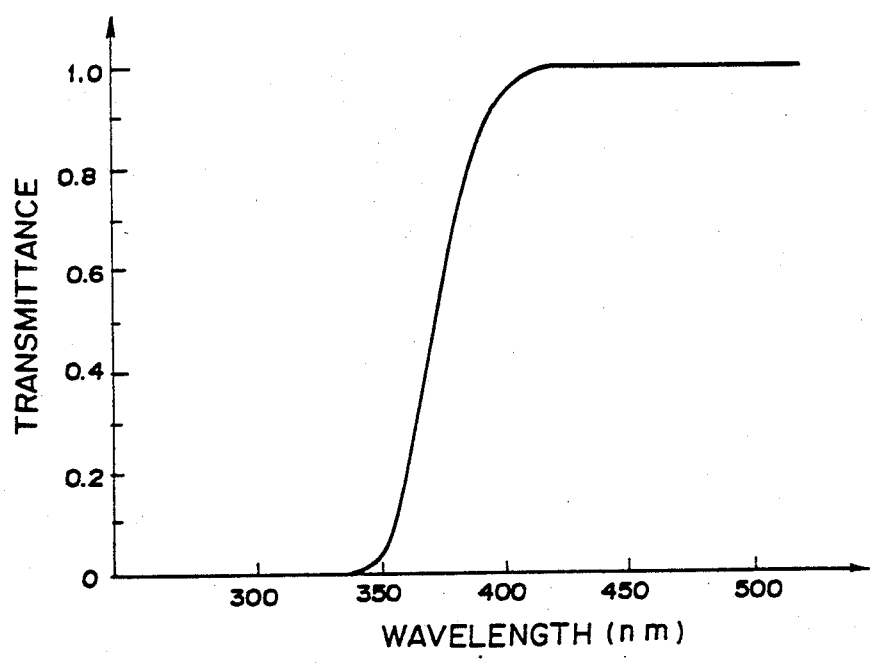
FIG. 11 is a graph showing a transmission spectrum of the PRA in a solvent.
Figure 13:
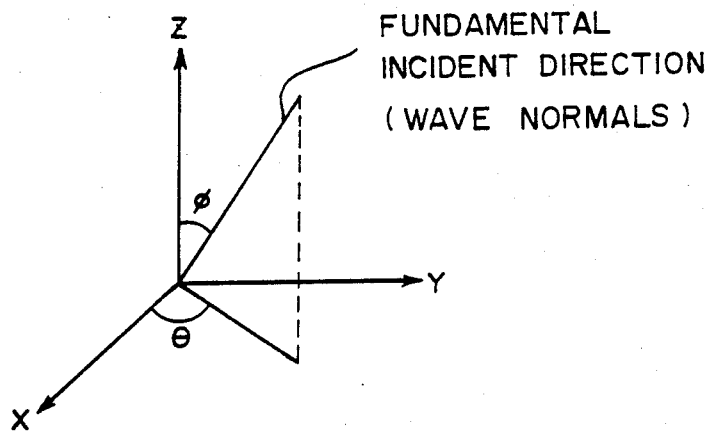
FIG. 13 is diagram explaining an angle $\phi$ formed between the direction in which a fundamental travels and an optical axis Z, and an angle $\frac{1}{4}$ formed between the plane of polarization of the fundamental and an optical axis X.

A process of manufacturing the optical wavelength converter device 110 will be described below. A hollow glass fiber 112' which will serve as cladding 112 is provided, the hollow glass fiber 112' being made of SFS3 glass, for example, and having an outside diameter of about 100 $\mu$m and the hollow space therein having a diameter of 6 $\mu$m. As shown in FIG. 12, PRA is kept as a molten solution 111' in a furnace or the like, and one end of the glass fiber 112' is immersed in the molten solution 111'. Then, the molten solution 111' of the PRA enters the hollow space in the glass fiber 112' due to capillarity. The molten solution 111' is kept at a temperature slightly higher than the melting point (102° C.) of the PRA in order to prevent this material from being decomposed. Thereafter, the glass fiber 112' is quickly cooled to cause the PRA in the hollow space to be polycrystallized.

Then, the optical fiber 112' is gradually pulled from the furnace which is kept at the temperature (e.g., 102.5° C.) higher than the melting point of the PRA into an outer space which is kept at a temperature lower than that melting point, for thereby causing the PRA in the melted state to be monocrystallized continuously at the point where it is withdrawn from the furnace. The PRA as it is withdrawn from the furnace is monocrystallized for a range of 50 nm or more, thus forming the core 111 with a uniform crystal orientation. Therefore, the optical wavelength converter device 110 thus formed is sufficiently long. Since the wavelength conversion efficiency of the optical wavelength converter device of this type is proportional to the length of the device, as is well known in the art, the longer the optical wavelength converter device, the greater the practical value of the device.

Figure 10:
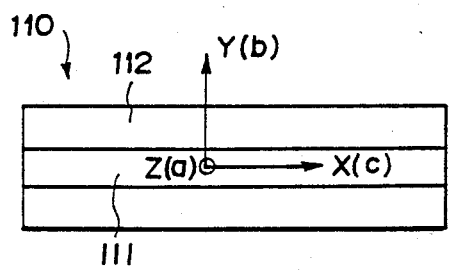
FIG. 10 is a view showing the crystal orientation of the core of an optical wavelength converter device which constitutes the optical wavelength converter module according to the present invention.

With the PRA filled as a monocrystalline state in the glass fiber 112', the crystal orientation thereof is such that the c-axis (which is the optical X-axis) extends along the core axis, as illustrated in FIG. 10.

For monocrystallizing the PRA in the above manner, there may be carried out a method which employs a Bridgman furnace as disclosed in Japanese Laid-Open Patent Publn. No. 62-231945, for example. The glass fiber 112' should be withdrawn at a speed of 5 mm/h, for example.

After the core 111 is filled in the glass fiber 111', the opposite ends of the glass fiber 111' are suitably cut off to complete the optical wavelength converter device 110 having a length of 10 mm. The optical wavelength converter device 110 is combined with the light source device 120, thereby constructing the optical wavelength converter module, as shown in FIG. 9. In the illustrated embodiment, a semiconductor laser 121 is used as a light source for emitting a fundamental. A laser beam (fundamental) 115 having a wavelength of 820 nm emitted from the semiconductor laser 121 is converted by a collimator lens 122 to a parallel-ray beam, which then passes through an anamorphic prism pair 123 and a $\lambda/2$ plate 125. The laser beam is thereafter converged by a condensing lens 126 into a beam spot which is applied to an entrance end surface 110a of the optical wavelength converter device 110, whereupon the fundamental 115 enters the optical wavelength converter device 10. As described above, the PRA which the core 111 is made of has such crystal orientation that the X-axis extends along the core axis. In the embodiment, the fundamental 115 which is of a Y-polarized state is applied to the optical wavelength converter device 110 by rotating the $\lambda/2$ plate 125 of the light source device 120.

The fundamental 115 that has entered the optical wavelength converter device 110 is then converted to a second harmonic 115' having a wavelength (410 nm) which is ½ of that of the fundamental 115, by the PRA which the core 111 is made of. The second harmonic 115' progresses through the device 110 while repeating total reflection between outer surfaces of the cladding 112, for achieving phase matching between a guided mode in which the fundamental 115 is guided through the core 111 and a radiation mode in which the second harmonic 115' is radiated into the cladding 112 (so-called "Cherenkov radiation").

A beam 115" which is a mixture of the second harmonic 115' and the fundamental 115 is emitted from an exit end surface 110b of the optical wavelength converter device 110. The emitted beam 115" is converged by a condensing lens 127, and then passed through a bandpass filter 128 which allows the second harmonic 115' of 410 nm to pass therethrough while absorbing the fundamental 115 of 820 nm. Therefore, only the second harmonic 115' is extracted for use. It was confirmed, using a polarizing plate, that the second harmonic 115' was Z-polarized light. In this embodiment, therefore, a nonlinear optical constant $d_{32}$ of the PRA is utilized. The light intensity of the second harmonic 115' was measured by a light power meter to find the wavelength conversion efficiency. The wavelength conversion efficiency was about 1% for the input energy of 1W.

The refractive indexes of the core 111 of the PRA and the cladding 112 of the SFS3 glass with respect to the fundamental ($\lambda=820$ nm) and the second harmonic ($\lambda=410$ nm) are given in the table below. For the more 111, the refractive indexes $n_x$, $n_y$, $n_z$ in the directions of the X-, Y-, and Z-axes are shown.

|  | $\lambda = 820$ nm | $\lambda = 410$ nm |
|---|---|---|
| Cladding $n_{clad}$ | 1.76 | 1.84 |
| Core |  |  |
| $n_x$ | 1.52 | — |
| $n_y$ | 1.78 | — |
| $n_z$ | 1.70 | 1.9 |

From the above table, it will be seen that $n_{clad}<n_y$ for the fundamental of 820 nm and the wave-guiding conditions are met.

<4th Embodiment>

An optical wavelength converter device comprises cladding of a glass fiber of SFS8 glass and a core of PRA, the optical wavelength converter device being manufactured in the same conditions as those of the second embodiment. Also in this embodiment, the crystal of the PRA is oriented such that the c-axis extends along the core axis.

A YAG laser beam which was Z-polarized and had a wavelength of 1064 nm was applied as a fundamental to the optical wavelength converter device. It was confirmed that a Z-polarized second harmonic was generated. In this embodiment, therefore, a nonlinear optical constant $d_{33}$ of the PRA is utilized. The wavelength conversion efficiency was about 1% for the input energy of 1W, as with the second embodiment.

The refractive indexes of the core and the cladding with respect to the fundamental ($\lambda=1064$ nm) and the second harmonic ($\lambda=532$ nm) are as follows:

|  | $\lambda = 1064$ nm | $\lambda = 532$ nm |
|---|---|---|
| Cladding $n_{clad}$ | 1.67 | 1.70 |
| Core |  |  |
| $n_x$ | 1.52 | — |
| $n_y$ | 1.77 | 1.86 |
| $n_z$ | 1.69 | 1.75 |

For the fundamental of 1064 nm, $n_{clad}<n_z$, and the wave-guiding conditions are met. Since $n_{clad}<n_y$ for the fundamental of 1064 nm, as described above, it is also possible to apply a Y-polarized fundamental to the optical wavelength converter device for the utilization of a nonlinear optical constant $d_{32}$ of the PRA.

<5th Embodiment>

An optical wavelength converter device comprises cladding of a glass fiber of SFS10 glass and a core of PRA, the optical wavelength converter device being manufactured in the same conditions as those of the second embodiment. Also in this embodiment, the crystal of the PRA is oriented such that the c-axis extends along the core axis.

A YAG laser beam which was Z-polarized and had a wavelength of 1064 nm was applied as a fundamental to the optical wavelength converter device. It was confirmed that a Z-polarized second harmonic was generated. In this embodiment, therefore, a nonlinear optical constant $d_{32}$ of the PRA is utilized. The wavelength conversion efficiency was about 1% for the input energy of 1W, as with the second embodiment.

The refractive indexes of the core and the cladding with respect to the fundamental ($\lambda=1064$ nm) and the second harmonic ($\lambda=532$ nm) are as follows:

|  | $\lambda = 1064$ nm | $\lambda = 532$ nm |
|---|---|---|
| Cladding $n_{clad}$ | 1.70 | 1.74 |
| Core |  |  |
| $n_x$ | 1.52 | — |
| $n_y$ | 1.77 | 1.86 |
| $n_z$ | 1.69 | 1.75 |

For the fundamental of 1064 nm, $n_{clad}<n_y$, and the wave-guiding conditions are met. Since $n_{clad}<n_z$ for the fundamental of 1064 nm, it is not possible to apply a Z-polarized fundamental to the optical wavelength converter device for the utilization of a nonlinear optical constant $d_{33}$ of the PRA.

With the optical wavelength converter modules of the present invention, as described above, since the high nonlinear optical constants which the PRA has can actually be utilized in the fiber type nonlinear optical material, and the optical wavelength converter device can be of a sufficient length, very high wavelength conversion efficiency can be achieved. Inasmuch as the PRA has an absorption edge near 400 nm as described above, the optical wavelength converter module can be extract a second harmonic highly efficiently in a blue range by employing a laser beam of about 800 nm as a fundamental.

Although certain preferred embodiments have been shown and described, it should be understood that many changes and modifications may be made therein without departing from the scope of the appended claims.

We claim:

1. An optical wavelength conversion method of converting linearly polarized fundamental to a second harmonic which has a wavelength that is ½ of the wavelength of the fundamental by applying the fundamental to a nonlinear optical material represented by the following molecular diagram:

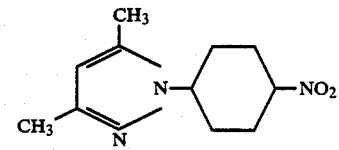

said method comprising the step of applying a fundamental having a wavelength ranging from 900 to 4000 nm to the nonlinear optical material to achieve angular phase matching of the type I for producing a second harmonic of the fundamental.

2. A optical wavelength converter module comprising:

(i) a fiber type optical wavelength converter device including cladding and a core filled in said cladding, said core being made of a monocrstalline nonlinear optical material represented by the following molecular diagram:

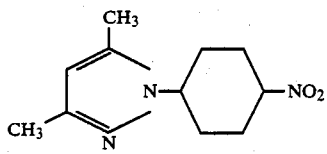

said optical material being a crystal which is as a rhombic system with three orthogonal axes a, b and c of the crystal being defined such that their lengths are in the order of b>a>c, and having a crystal orientation such that the c-axis thereof extends substantially along the axis of said core, and (ii) a light source device for applying a fundamental which is linearly polarized in the direction of the a-axis of b-axis of the crystal which are normal to said c-axis, to said optical wavelength converter device.

3. An optical wavelength converter module comprising:

(i) a fiber type optical wavelength converter device including cladding and a core filled in said cladding, said core being made of a monocrystalline nonlinear optical material represented by the following molecular diagram:

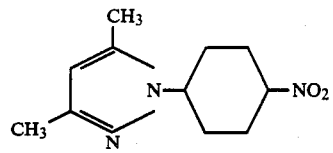

said optical material having a crystal orientation such that the c-axis thereof extends substantially along the axis of said core, and (ii) a light source device for applying a fundamental which is linearly polarized in the direction of the a-axis or b-axis of the crystal which are normal to said c-axis to said optical wavelength converter device.

* * * * *